Dec. 8, 1964    R. C. HABOUSH    3,159,844
ELECTROMAGNETICALLY CONTROLLED HOOD DEVICE
FOR WELDING AND CUTTING
Filed Nov. 9, 1962    2 Sheets-Sheet 1

INVENTOR.
ROBERT C. HABOUSH
BY
McMorrow, Berman & Davidson
Attorneys

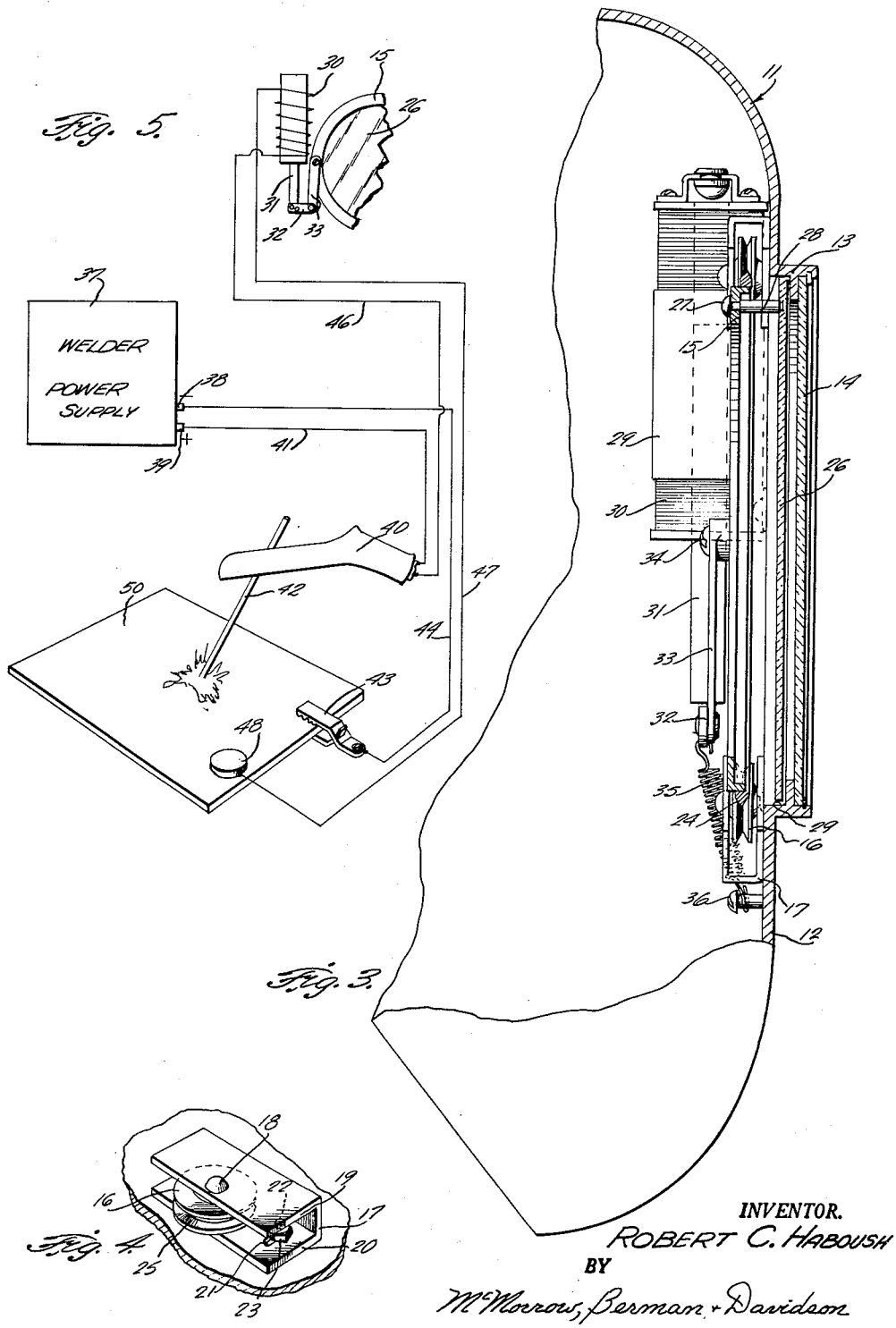

3,159,844
ELECTROMAGNETICALLY CONTROLLED HOOD
DEVICE FOR WELDING AND CUTTING
Robert C. Haboush, Miami, Fla., assignor to
Samuel C. Halpert
Filed Nov. 9, 1962, Ser. No. 236,552
3 Claims. (Cl. 2—8)

This invention relates to welding equipment, and more particularly to electromagnetically controlled protective hood or shield for use in welding or cutting.

A main object of the invention is to provide a novel and improved protective shield or hood for use by a welder or by a person using a cutting torch to protect his face and particularly to protect his eyes from injurious radiation from the high temperature torch or welding arc, the device being simple in construction, being reliable in operation, and being relatively compact in size so that it can be comfortably worn.

A further object of the invention is to provide an improved electromagnetically controlled protective welding mask or shield adapted to be worn by a person using welding equipment or a cutting torch, or any other electrically operated apparatus for producing an arc from an electrical source of power, the device being relatively inexpensive to fabricate, being durable in construction, and being arranged so that it provides clear vision at all times.

A further object of the invention is to provide an improved protective mask or shield for use by an electric arc welder, the device involving a minimum number of parts, being automatic in operation to reduce the visibility therethrough responsive to the establishment of a welding arc, providing clear vision when no welding is taking place, so as to facilitate the preparation for the welding operation, and automatically providing clear vision when the electrical power supply fails or is interrupted.

Further objects and advantages of the invention will become apparent from the following description and claims, and from the accompanying drawings, wherein:

FIGURE 3 is an enlarged fragmentary vertical cross sectional view taken substantially on the line 3—3 of FIGURE 1.

FIGURE 4 is an enlarged fragmentary perspective view showing one of the guide pulleys and its supporting bracket, as employed in the device shown in FIGURES 1 to 3 for supporting the glare-controlling polarizing disc for rotary movement.

FIGURE 5 is a schematic wiring diagram showing the electrical circuit connections of the protective mask or shield assembly of FIGURES 1 to 4.

Figure 1:
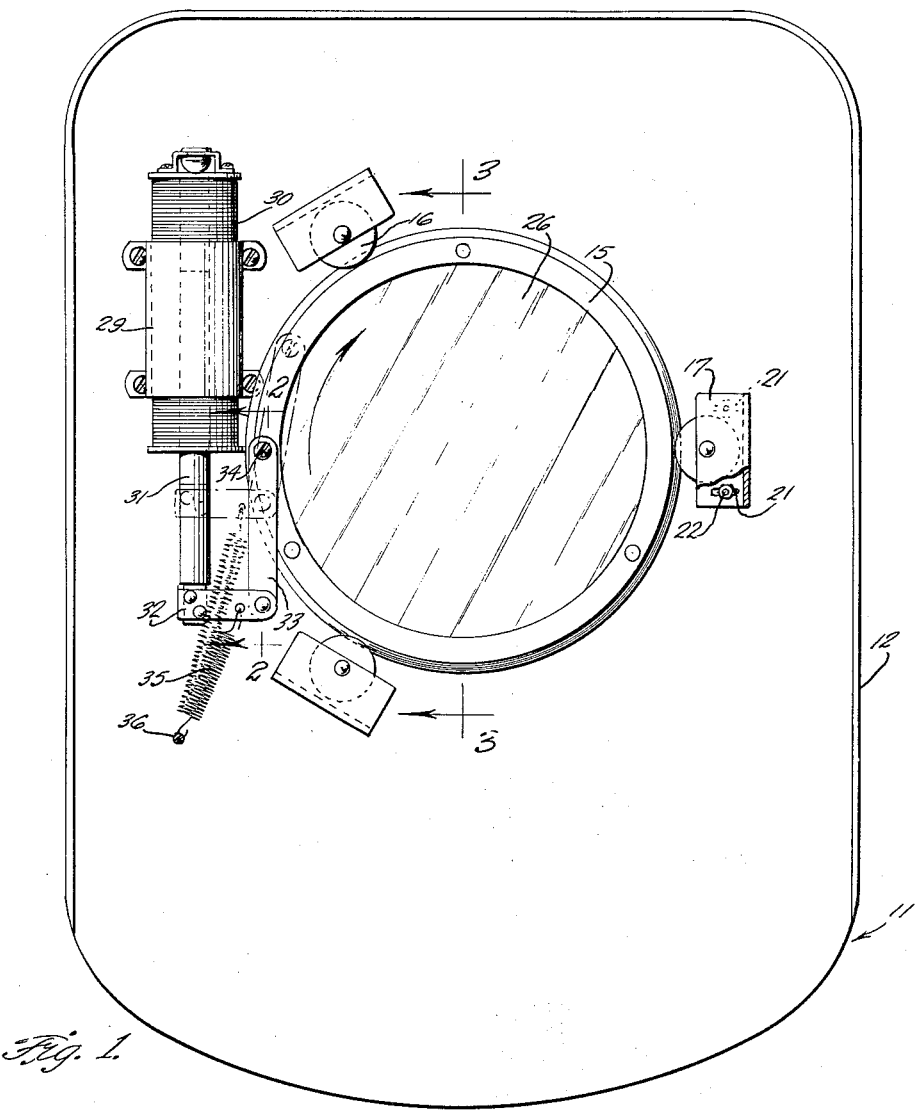
FIGURE 1 is a rear elevational view of a welder's mask provided with an improved electromagnetically controlled glare-reducing mechanism in accordance with the present invention.
Figure 2:
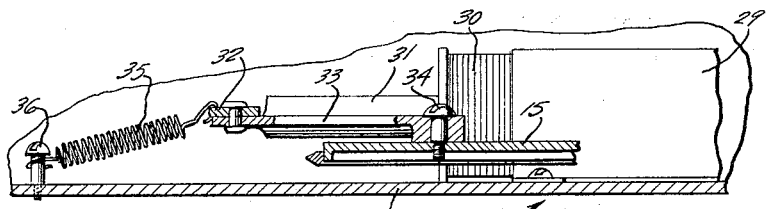
FIGURE 2 is an enlarged fragmentary cross sectional view taken substantially on the line 2—2 of FIGURE 1.

Referring to the drawings, 11 generally designates an improved protective mask or shield adapted to be worn by a person using electric welding or cutting equipment. The mask 11 comprises the main shield body 12 of suitable opaque mechanically durable material, such as metal, or the like, the body 12 being suitably shaped to receive and cover the face and neck of a person wearing same, suitable means being provided for supporting the device on the wearer, such means being conventional and being not specifically illustrated herein. The body 12 is generally of concave shape and is formed with the forwardly projecting annular window frame 13 in which is secured the circular plane-polarized viewing window 14.

The window 14 may be made of "Polaroid" material, which is transparent and which is plane polarized in one direction.

Designated at 15 is a ring which is rotatably supported coaxially with the annular window frame 13 by a plurality of grooved pulleys 16 mounted in channel-shaped supporting brackets 17 secured to the body 12. Thus, each grooved pulley 16 is rotatably mounted on a transverse pin 18 extending through the side arms 19 and 20 of its associated bracket 17, as shown in FIGURE 4, the arm 20 of the bracket being formed with a pair of parallel slots 21, 21 through which extend fastening screws 22 provided with clamping nuts 23. The ring 15 is provided with the outwardly projecting tapered annular flange 24 which is received in the generally V-shaped grooves 25 of the pulleys 16, whereby the ring is supported for rotary movement around its axis, which is the same axis as that of the frame 13 and the plane-polarized window 14.

Designated at 26 is a second plane-polarized disc which is secured to the ring 15 by spaced rivets 27 provided with spacer sleeves 28, so that the disc 26 is supported in parallel relation to the ring 15 and is spaced therefrom by the spacer discs 28, as is clearly shown in FIGURE 3. The polarizing disc 26 is supported in an annular recess 29 defined inside the annular flange 13 inwardly adjacent to the annular seat in which the plane-polarized disc 14 is received, as shown in FIGURE 3. The peripheral edge of the inner polarizing disc 26 is freely movable in the annular recess 29 so that it can rotate freely with the ring 15.

Secured to the inside surface of the mask body 12 is a generally U-shaped clamping sleeve 29 in which is clamped a solenoid 30, the sleeve 29 being vertically arranged, as shown in FIGURE 1, whereby solenoid 30 is likewise vertically arranged. The solenoid 30 is provided with the vertical plunger 31 which projects below the solenoid and which has secured to its lower end a horizontally extending arm 32. The end of arm 32 is connected by a link arm 33 and a pivot screw 34 to the ring 15. A coiled spring 35 connects arm 32 to an anchoring pin 36 threadedly secured in the mask body 12 below the solenoid 30, as shown in FIGURE 1, the spring 35 biasing the plunger 31 downwardly and biasing the ring 15 to the full line position thereof shown in FIGURE 1, namely, to a position wherein the axis of polarization of the inner polarizing disc 26 is substantially crossed with respect to the axis of polarization of the outer polarizing disc 14, namely, to a position wherein light transmission through the pair of discs 14 and 26 is substantially reduced.

When the solenoid 30 is energized, it retracts its plunger, namely, moves it upwardly from the position thereof shown in full line view in FIGURE 1, so that the arm 32 is elevated to its dotted view position, and so that the link arm 33 rotates the ring 15 in a clockwise direction, as viewed in FIGURE 1, to a position wherein the axis of polarization of the inner disc 26 approaches parallelism with the axis of polarization of the outer polarizing disc 14, whereby to provide substantially maximum light transmission through the two polarizing discs 14 and 26. Thus, clear vision is provided through the windows 26 and 14 when the solenoid 30 is energized, and the light transmission through said windows 14 and 26 is substantially reduced when the solenoid 30 becomes deenergized.

Referring now to FIGURE 5, 37 generally designates a conventional power supply for electric arc welding, said welding power supply being provided with the negative output terminal 38 and the positive output terminal 39. The positive terminal 39 is connected to the electrode holder 40 by a wire 41, the electrode holder 40 being adapted to receive and clampingly support a welding rod 42. A ground clamp 43 is connected by a wire 44 to the negative terminal 38 of the power supply.

One terminal of solenoid 30 is connected by a wire 46 to the electrode holder 40, and thus to the positive terminal 39 of power supply 37. The remaining terminal of solenoid 30 is connected by a wire 47 to a connection disc 48 of permanently magnetized material, such as permanently magnetized steel, or of material which is highly magnetized, such as "Alnico," or the like.

As shown in FIGURE 5, when a welding operation is to be performed, for example, on a steel plate 50, shown in FIGURE 5, the ground clamp 43 is engaged with the plate, and the permanently magnetized member 48 is likewise engaged with said plate. This energizes the solenoid 30 by a circuit comprising positive terminal 39 of power supply 37, wire 41, the electrode holder 40, wire 46, the winding of solenoid 30, wire 47, the magnet 48, the plate 50, the ground clamp 43, the wire 44 and the negative terminal 38 of the power supply. Under these conditions, the plunger 31 is elevated to the dotted view position thereof shown in FIGURE 1, and the inner polarizer 26 is rotated to a position wherein its axis of polarization approaches parallelism with the axis of polarization of the outer polarizing disc 14, thus affording substantially maximum light transmission through the windows 14 and 26. The operator is thus enabled to clearly see through the mask and thus can efficiently make necessary preparations to perform the welding operation. When the rod 42 approaches sufficiently close to the plate 50 to be welded, an arc is struck, which substantially short circuits the solenoid 30, because the voltage across the arc is much lower than that required to energize the solenoid 30. In other words, the welding arc acts as a low resistance shunt across the solenoid winding, causing the solenoid to become deenergized, whereby the spring 35 moves the plunger 31 and returns the disc 26 to the full line position thereof shown in FIGURE 1, namely, to the position wherein its axis of polarization is substantially crossed with respect to the axis of polarization of the outer disc 14, and wherein the light transmission through the discs 14 and 26 is substantially reduced. This automatically protects the operator from the radiation developed by the formation of the welding arc and by its subsequent continuation, the disc 26 being retained in its crossed position with respect to the disc 14 as long as the arc continues. After the welding operation is completed, and the arc is extinguished by the removal of the welding rod 42 from the plate 50, the solenoid 30 again becomes energized and returns the inner polarizing disc 26 to its uncrossed position, affording clear visibility through the windows 26 and 14.

It will be noted that in the event of failure of the power supply 37 or of a break or interruption in the connecting wires 41 or 44, or in the event of disengagement of the grounding clamp 43 from the plate 50, the solenoid 30 will become deenergized and cause the disc 26 to be rotated to its crossed position with respect to the disc 14. Thus, a failure in the welding system will always bring the disc 26 to its safe position.

The solenoid 30 may be designed to retract the plunger 31 responsive to the application of any voltage above the welding working voltage, for example, may be designed to retract its plunger 31 when subjected to a voltage from 21 to 150 volts. When the arc is established between the welding arc 42 and the work piece 50, the voltage across the arc drops to the welding working voltage, which is of the order of 21 volts or less, which is insufficient to maintain the solenoid 30 energized.

It will be noted that if at any time during a welding operation the operator desires to restore clear vision, it is merely necessary for him to remove the welding rod 42 from the work piece, which extinguishes the arc and which removes the shunt from across the terminals of solenoid 30, thus allowing said solenoid to become energized and to return the polarizing disc 26 to its uncrossed position. During the welding operation, the disc 26 is in its crossed position, reducing light transmission sufficiently so that the welder can watch the electrode 42 safely.

While a specific embodiment of an improved electromagnetically controlled welding mask or shield has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A welder's mask comprising an opaque main body having a viewing opening, a first plane polarized light-transmitting window member mounted in said viewing opening, a second plane polarized light-transmitting window member parallel and closely adjacent to said first light-transmitting member, a circular ring, a plurality of spaced rivets rigidly connecting the ring to said second window member, said rivets being provided with spacer sleeves between the ring and the second window member to maintain the ring in spaced parallel relationship to the second window member, a plurality of peripherally grooved rollers journaled to said main body around the viewing opening and receiving the periphery of the ring in the grooves thereof, whereby to rotatably support said second window member for rotation relative to said first window member, means biasing said second member toward a position wherein the axes of polarization of the light-transmitting members are crossed, electromagnetic means operatively connected to said ring to rotate said second member to a position wherein the axes of polarization of said first and second members are at a substantially smaller angle to each other than in said first-named position responsive to energization of said electromagnetic means, a welding power supply having a pair of output terminals, a welding electrode connected to one terminal, a ground conductor connected to the other terminal, and circuit means connecting said electromagnetic means across said welding electrode and ground conductor, whereby to energize said electromagnetic means unless the electrode and ground conductor are substantially shunted.

2. A welder's mask comprising an opaque main body having a viewing opening, a first plane polarized light-transmitting window member mounted in said viewing opening, a second plane polarized light-transmitting window member parallel and closely adjacent to said first light-transmitting member, a circular ring, a plurality of spaced rivets rigidly connecting the ring to said second window member, said rivets being provided with spacer sleeves between the ring and the second window member to maintain the ring in spaced parallel relationship to the second window member, a plurality of peripherally grooved rollers journaled to said main body around the viewing opening and receiving the periphery of the ring in the grooves thereof, whereby to rotatably support said second window member for rotation relative to said first window member, means biasing said ring toward a position wherein the axes of polarization of the light-transmitting members are crossed, electromagnetic means operatively connected to said second light-transmitting member to rotate said ring to a position wherein the axes of polarization of said first and second members are at a substantially smaller angle to each other than in said first-named position responsive to energization of said electromagnetic means, a welding power supply having a pair of output terminals, a welding electrode connected to one terminal, a ground conductor connected to the other terminal, a permanently magnetized contact member adapted to be engaged with a work piece simultaneously with the connection of said ground conductor to said work piece, and circuit means connecting said electromagnetic means between said contact member and electrode, whereby to energize the electromagnetic means when the contact member and ground conductor are connected to a work piece unless said electrode and ground conductor are substantially shunted.

3. A welder's mask comprising an opaque main body having a viewing opening, a first circular plane polarized light-transmitting window member mounted in said viewing opening, a circular frame, at least three peripherally grooved rollers journaled to said main body and spaced around said viewing opening, said frame having an outwardly projecting tapered peripheral flange engaged between said grooved rollers, said rollers rotatably supporting said frame closely adjacent and parallel to said first window member, a second circular plane polarized light-transmitting member located coaxially adjacent and parallel to said first window member, a plurality of spaced rivets rigidly connecting the peripheral portions of said second circular light transmitting member to said frame, said rivets being provided with spacer sleeves between said second circular member and said frame to maintain the second circular member in spaced parallel relationship to the frame, means biasing said frame toward a position wherein the axes of polarization of the light-transmitting members are crossed, electromagnetic means operatively connected to said frame to rotate said second member to a position wherein the axes of polarization of said first and second members are at a substantially smaller angle to each other than in said first-named position responsive to energization of said electromagnetic means, a welding power supply having a pair of outlet terminals, a welding electrode connected to one terminal, a ground conductor connected to the other terminal, a permanently magnetized contact member adapted to be engaged with a work piece simultaneously with the connection of said ground conductor to said work piece, and circuit means connecting said electromagnetic means between said contact member and electrode, whereby to energize said electromagnetic means when the contact member and ground conductor are connected to a work piece unless said electrode and ground conductor are substantially shunted.

References Cited in the file of this patent
UNITED STATES PATENTS

| | | |
|---|---|---|
| 2,036,244 | Lincoln et al. | Apr. 7, 1936 |
| 2,417,883 | Oschin | Mar. 25, 1947 |
| 2,548,230 | Molyneux | Apr. 10, 1951 |

FOREIGN PATENTS

| | | |
|---|---|---|
| 937,935 | France | Mar. 22, 1948 |